(12) United States Patent
Hasegawa et al.

(10) Patent No.: US 12,649,239 B2
(45) Date of Patent: Jun. 9, 2026

(54) APPARATUS, APPARATUS CONTROL METHOD AND RECORDING MEDIUM

(71) Applicant: CASIO COMPUTER CO., LTD., Tokyo (JP)

(72) Inventors: Hirokazu Hasegawa, Koganei (JP); Wataru Nimura, Hamura (JP); Erina Ichikawa, Sagamihara (JP); Tomio Higo, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 136 days.

(21) Appl. No.: 18/372,406

(22) Filed: Sep. 25, 2023

(65) Prior Publication Data

US 2024/0100699 A1 Mar. 28, 2024

(30) Foreign Application Priority Data

Sep. 26, 2022 (JP) ................................. 2022-152969

(51) Int. Cl.
B25J 11/00 (2006.01)
B25J 9/16 (2006.01)

(52) U.S. Cl.
CPC .......... B25J 9/1669 (2013.01); B25J 11/0005 (2013.01)

(58) Field of Classification Search
CPC ..... B25J 9/1669; B25J 11/0005; A63H 13/00; A63H 13/005; A63H 2200/00
See application file for complete search history.

(56) References Cited

U.S. PATENT DOCUMENTS

| | | | | |
|---|---|---|---|---|
| 2010/0256812 A1* | 10/2010 | Tsusaka | ................... | B25J 5/007 |
| | | | | 700/254 |
| 2017/0095925 A1* | 4/2017 | Yamane | ................. | B25J 9/1633 |
| 2018/0129217 A1* | 5/2018 | Asada | .................. | G05D 1/0246 |
| 2018/0300676 A1* | 10/2018 | Peterson | ............... | B60Q 1/507 |
| 2019/0107833 A1* | 4/2019 | Song | ....................... | G06F 3/167 |
| 2019/0358812 A1* | 11/2019 | Motoyoshi | ............ | B25J 9/1633 |
| 2020/0262460 A1* | 8/2020 | Kim | ...................... | B62B 5/0073 |
| 2021/0303964 A1 | 9/2021 | Hasegawa et al. | | |
| 2022/0044679 A1* | 2/2022 | Sima | ....................... | G10L 15/26 |

(Continued)

FOREIGN PATENT DOCUMENTS

| | | |
|---|---|---|
| JP | 2002-239960 A | 8/2002 |
| JP | 2004-118554 A | 4/2004 |

(Continued)

OTHER PUBLICATIONS

EPO; Application No. 23197226.6; Extended European Search Report dated Feb. 19, 2024.

(Continued)

*Primary Examiner* — Sohana Tanju Khayer
(74) *Attorney, Agent, or Firm* — Fitch, Even, Tabin & Flannery LLP

(57) ABSTRACT

A controller of a robot executes processing of determining whether an apparatus is likely to be subjected to an impact and, when determination is made that the apparatus is likely to be subjected to an impact in a case where a movable part is in a first state in which the movable part is able to cause the apparatus to execute a physical operation, transferring the movable part from the first state to a second state for suppressing an impact exerted on the movable part.

10 Claims, 11 Drawing Sheets

(56)            References Cited

U.S. PATENT DOCUMENTS

| 2022/0134559 | A1* | 5/2022 | Li | B25J 15/0616 |
| | | | | 700/255 |
| 2022/0138466 | A1* | 5/2022 | Bisulco | G06V 10/82 |
| | | | | 348/142 |
| 2022/0281109 | A1* | 9/2022 | Hayashi | B25J 9/1664 |
| 2022/0299999 | A1 | 9/2022 | Hasegawa et al. | |
| 2023/0191269 | A1* | 6/2023 | Nakayama | A63H 3/28 |
| | | | | 700/246 |
| 2023/0418258 | A1* | 12/2023 | Mirth | B25J 19/06 |
| 2024/0019868 | A1* | 1/2024 | Harumoto | G06V 40/10 |
| 2024/0253242 | A1* | 8/2024 | Sodeyama | B25J 11/008 |

FOREIGN PATENT DOCUMENTS

| JP | 2005-138631 | A | 6/2005 |
| JP | 2010-137308 | A | 6/2010 |
| JP | 2011-128415 | A | 6/2011 |
| JP | 2014-042385 | A | 3/2014 |
| JP | 2017-153545 | A | 9/2017 |
| JP | 2019-166580 | A | 10/2019 |
| JP | 2021-010677 | A | 2/2021 |
| JP | 2024-47382 | A | 4/2024 |
| WO | 2019131696 | A1 | 7/2019 |

OTHER PUBLICATIONS

JPO; Application No. 2022-152969; Notice of Reasons for Refusal dated Oct. 22, 2024.
JPO; Application No. 2024-203704; Notice of Reasons for Refusal dated Feb. 10, 2026.

* cited by examiner

| CONTROL CONDITION | CONTROL DATA |
|---|---|
| BODY IS STROKED | MOTION DATA<br>0:0:0<br>500:60:0<br>1000:60:60<br>1500:60:-60<br>2000:60:60<br>2500:60:-60<br><br>SOUND EFFECT DATA<br>PLEASED SOUND |
| LARGE SOUND IS HEARD | MOTION DATA<br>0:0:0<br>100:60:0 |
| BEING TALKED | SOUND EFFECT DATA<br>BRIGHT SOUND |
| BREATHING CYCLE ELAPSED | MOTION DATA<br>0:0:0<br>1000:10:0<br>2000:0:0<br>3000:10:0<br>4000:0:0<br>5000:10:0<br>6000:0:0 |
| ⋮ | ⋮ |

FIG. 11

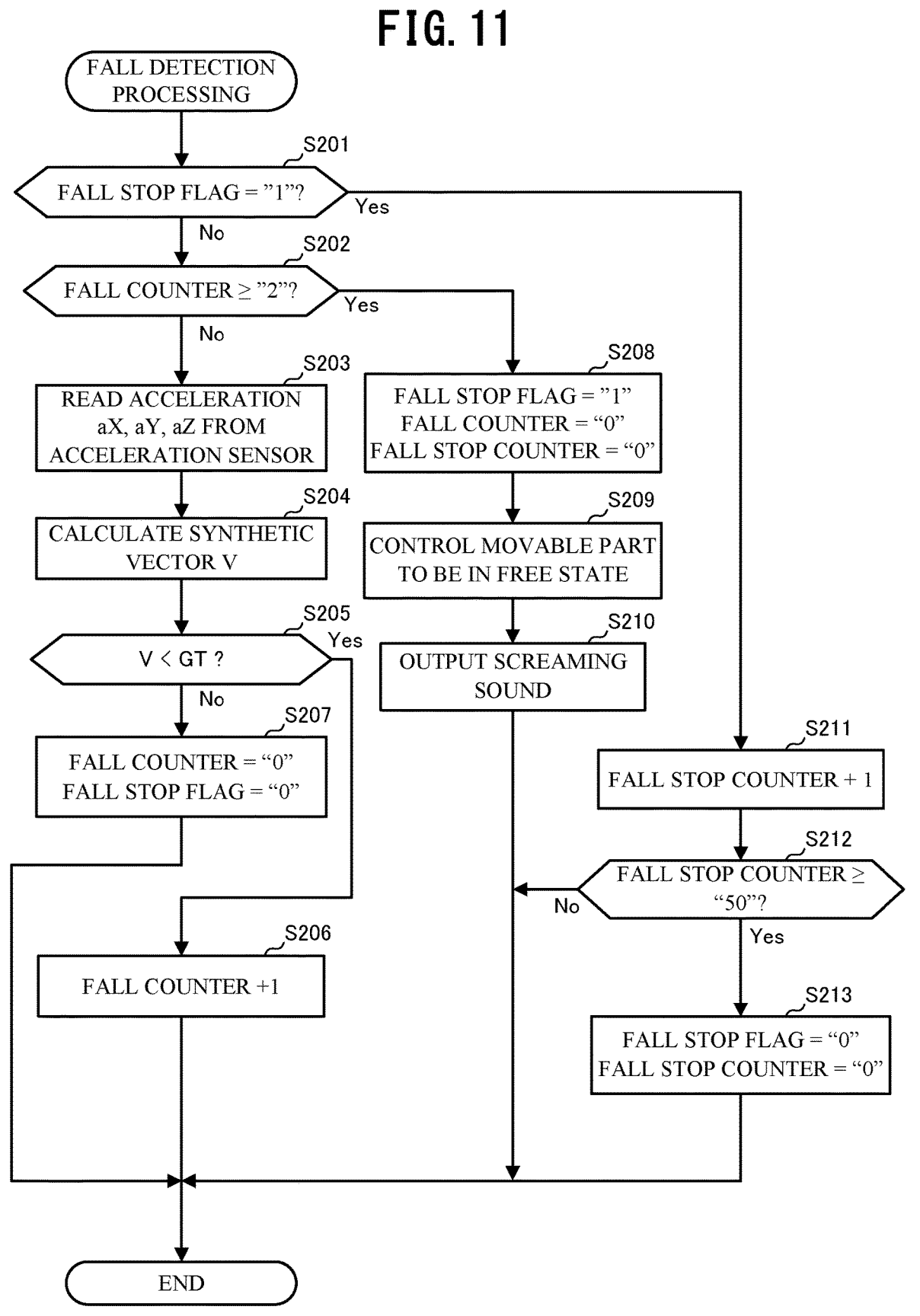

FALL DETECTION
PROCESSING

S201
FALL STOP FLAG = "1"? — Yes →

No

S202
FALL COUNTER ≥ "2"? — Yes →

No

S203
READ ACCELERATION
aX, aY, aZ FROM
ACCELERATION SENSOR

S204
CALCULATE SYNTHETIC
VECTOR V

S205
V < GT ? — Yes

No

S207
FALL COUNTER = "0"
FALL STOP FLAG = "0"

S206
FALL COUNTER +1

S208
FALL STOP FLAG = "1"
FALL COUNTER = "0"
FALL STOP COUNTER = "0"

S209
CONTROL MOVABLE PART
TO BE IN FREE STATE

S210
OUTPUT SCREAMING
SOUND

S211
FALL STOP COUNTER + 1

S212
FALL STOP COUNTER ≥
"50"? — No

Yes

S213
FALL STOP FLAG = "0"
FALL STOP COUNTER = "0"

END

FIG. 13

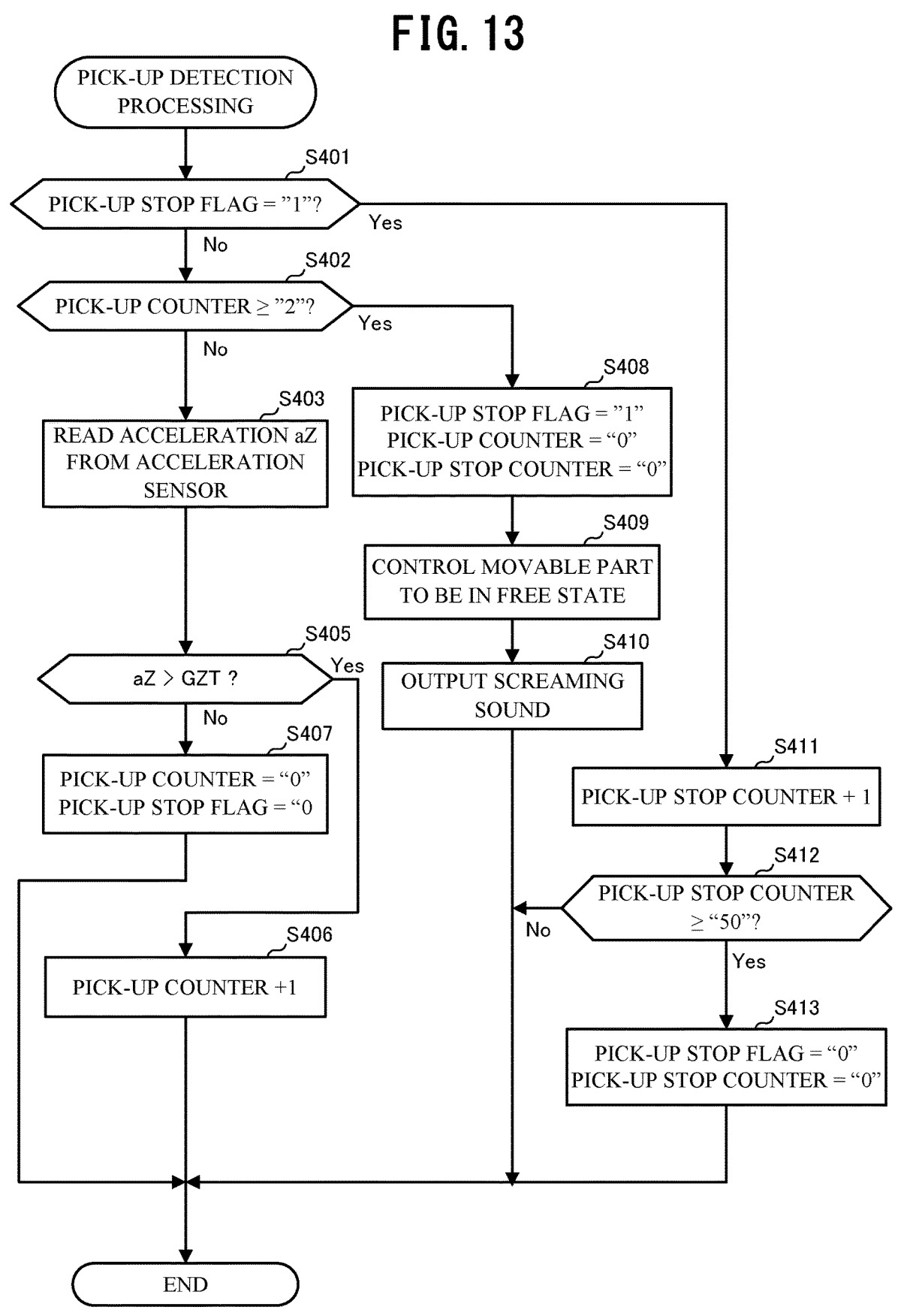

PICK-UP DETECTION
PROCESSING

S401

PICK-UP STOP FLAG = "1"?
→ Yes
No

S402

PICK-UP COUNTER ≥ "2"?
→ Yes
No

S403

READ ACCELERATION aZ
FROM ACCELERATION
SENSOR

S408

PICK-UP STOP FLAG = "1"
PICK-UP COUNTER = "0"
PICK-UP STOP COUNTER = "0"

S409

CONTROL MOVABLE PART
TO BE IN FREE STATE

S405 aZ > GZT ?
→ Yes
No

S410

OUTPUT SCREAMING
SOUND

S407

PICK-UP COUNTER = "0"
PICK-UP STOP FLAG = "0

S411

PICK-UP STOP COUNTER + 1

S412

PICK-UP STOP COUNTER
≥ "50"?
No
Yes

S406

PICK-UP COUNTER +1

S413

PICK-UP STOP FLAG = "0"
PICK-UP STOP COUNTER = "0"

END

FIG. 14

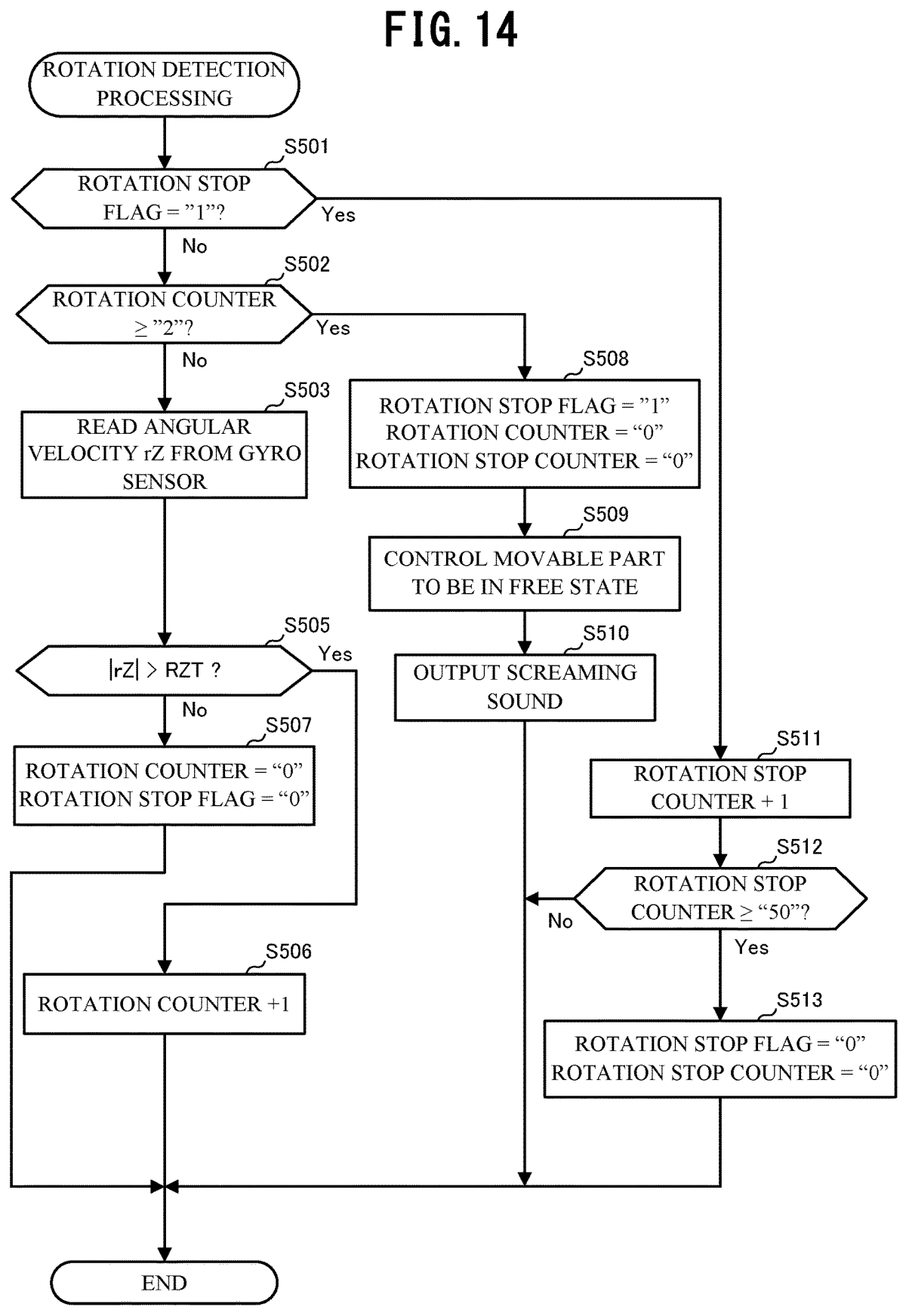

ROTATION DETECTION
PROCESSING

S501
ROTATION STOP
FLAG = "1"? ——— Yes

No

S502
ROTATION COUNTER
≥ "2"? ——— Yes

No

S503
READ ANGULAR
VELOCITY rZ FROM GYRO
SENSOR

S508
ROTATION STOP FLAG = "1"
ROTATION COUNTER = "0"
ROTATION STOP COUNTER = "0"

S509
CONTROL MOVABLE PART
TO BE IN FREE STATE

S505
$|rZ| > RZT$ ? ——— Yes

No

S510
OUTPUT SCREAMING
SOUND

S507
ROTATION COUNTER = "0"
ROTATION STOP FLAG = "0"

S511
ROTATION STOP
COUNTER + 1

S512
ROTATION STOP
COUNTER ≥ "50"? ——— No

Yes

S506
ROTATION COUNTER +1

S513
ROTATION STOP FLAG = "0"
ROTATION STOP COUNTER = "0"

END

APPARATUS, APPARATUS CONTROL METHOD AND RECORDING MEDIUM

CROSS-REFERENCE TO RELATED APPLICATIONS

This application claims the benefit of Japanese Patent Application No. 2022-152969, filed on Sep. 26, 2022, the entire disclosure of which is incorporated by reference herein.

FIELD OF THE INVENTION

The present disclosure relates to an apparatus, an apparatus control method, and a recording medium.

BACKGROUND OF THE INVENTION

Techniques are known to control the movement of robots and other apparatuses in such a way that the robots can imitate something users feel affection for, such as friends and pets. For example, Patent Literature 1 (Unexamined Japanese Patent Application Publication No. 2002-239960) describes a dog-type robotic device that behaves like an actual pet when an external stimulus such as a user stroking, lifting, or talking is applied. The robotic device includes a movable part including a servo motor and/or the like (a driving unit), and such a behavior can be realized by moving the head or the like connected to a gear member or the like driven by the servo motor or the like.

SUMMARY OF THE INVENTION

An aspect of an apparatus according to the present disclosure includes:
- a movable part that is a mechanism for performing a physical operation; and
- a controller that executes: processing of determining whether or not the apparatus is likely to be subjected to an impact; and processing of, in a case where determination is made that the apparatus is likely to be subjected to an impact in a case where the movable part is in a first state in which the movable part is able to cause the apparatus to execute a physical operation, transferring the movable part from the first state to a second state for suppressing an impact exerted on the movable part.

BRIEF DESCRIPTION OF DRAWINGS

A more complete understanding of this application can be obtained when the following detailed description is considered in conjunction with the following drawings, in which:

FIG. 9 is a diagram illustrating an example of a control content table according to the embodiment;

FIG. 11 is a flowchart of fall detection processing according to the embodiment;

FIG. 13 is a flowchart of pick-up detection processing according to the embodiment; and FIG. 14 is a flowchart of rotation detection processing according to the embodiment.

DETAILED DESCRIPTION OF THE INVENTION

Figure 1:
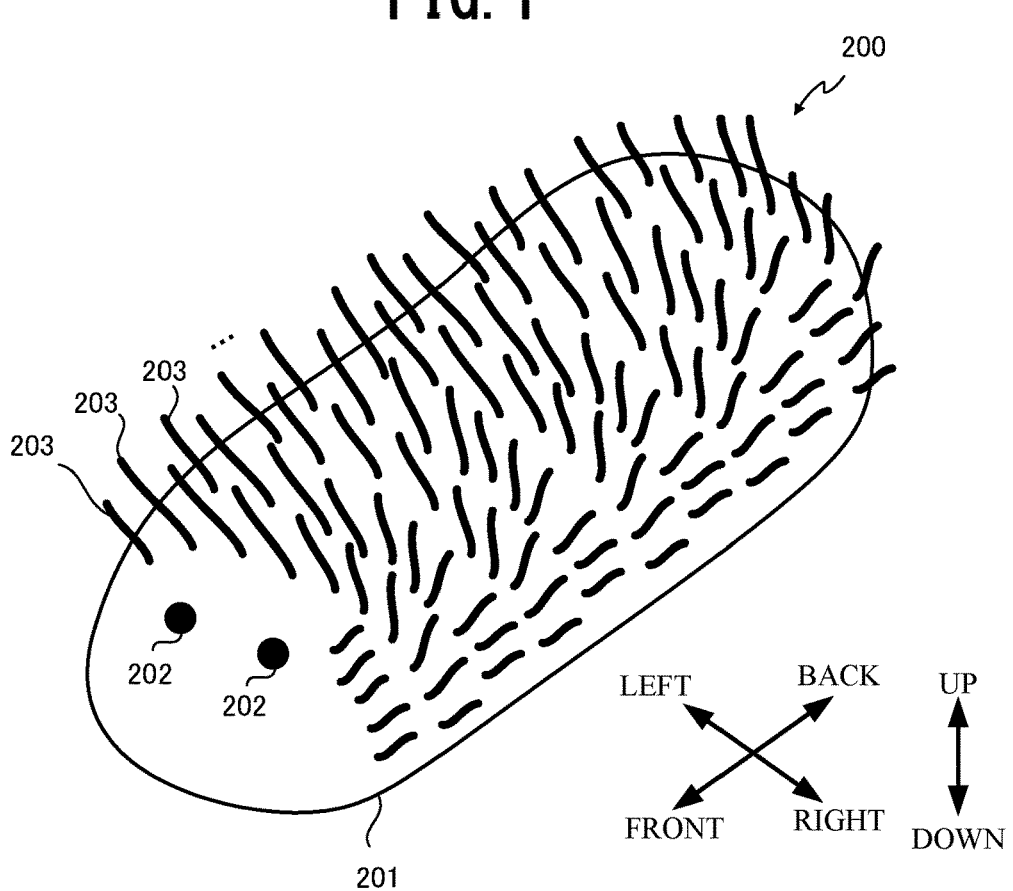
FIG. 1 is a diagram illustrating the appearance of a robot according to an embodiment.

The following describes an embodiment of the present disclosure with reference to the drawings. Note that the same or equivalent components in the drawings are denoted by the same reference numerals.

Embodiment

Figure 2:
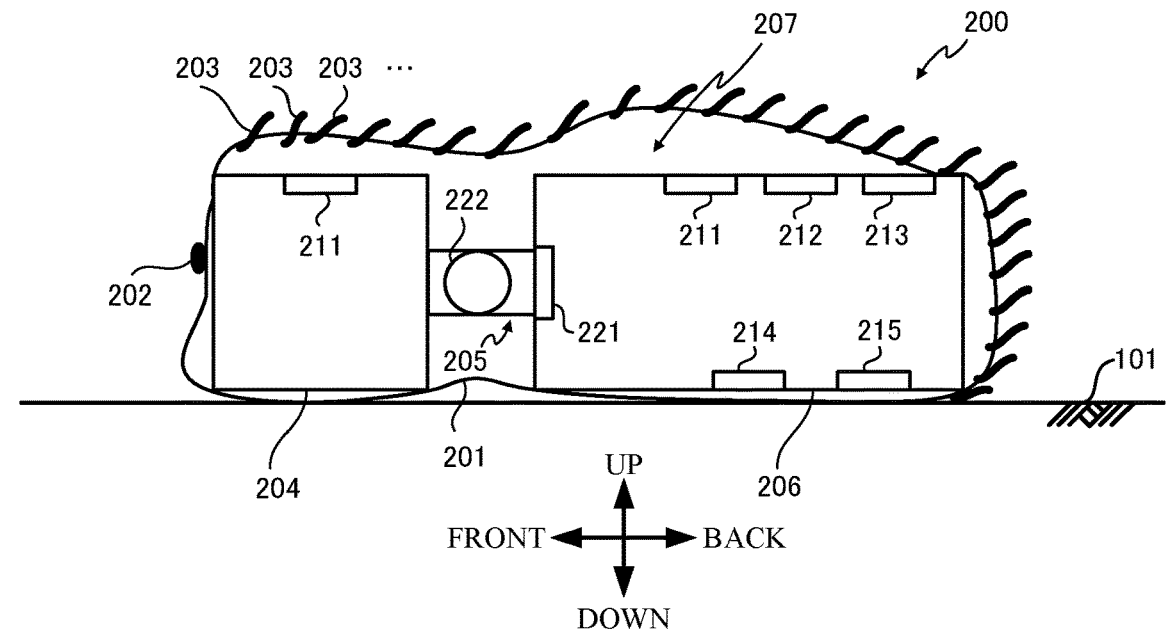
FIG. 2 is a cross-sectional view from a side of the robot according to the embodiment.

An embodiment in which the control device of an apparatus according to the present disclosure is applied to a robot 200 illustrated in FIG. 1 is described with reference to the drawings. The robot 200 according to the embodiment is a pet robot that imitates a small animal. In order to facilitate understanding, FIG. 1 denotes the directions of front, back, left, right, up-and-down. The following description proceeds with reference to these directions as necessary. The robot 200 is covered with an exterior 201 with eye-like decorative members 202 and bushy far 203 as illustrated in FIG. 1. The exterior 201 houses the housing 207 of the robot 200. As illustrated in FIG. 2, the housing 207 of the robot 200 includes a head 204, a joint 205, and a body 206 where the joint 205 couples the head 204 and the body 206. Note that, in FIG. 2, hatching patterns are omitted in view of facilitating visibility of the drawings.

The body 206 extends in the front-and-back direction as illustrated in FIG. 2. The body 206 is loaded through the exterior 201 on a mounting surface 101, such as a floor or a table, on which the robot 200 is placed. Also, as illustrated in FIG. 2, a twist motor 221 is provided at the front end of the body 206, and the head 204 is coupled to the front end of the body 206 through the joint 205. The joint 205 is provided with an up-and-down motor 222. Although the twist motor 221 is provided in the body 206 in FIG. 2, the twist motor 221 may be provided in the joint 205 or may be provided in the head 204.

Figure 3:
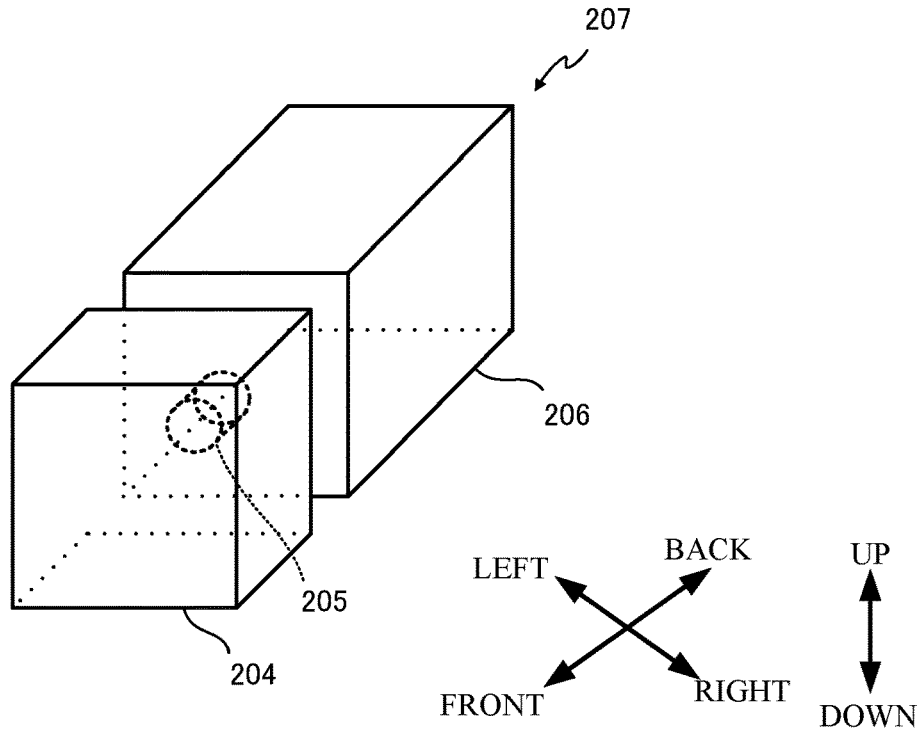
FIG. 3 is a diagram illustrating a housing of the robot according to the embodiment.
Figure 4:
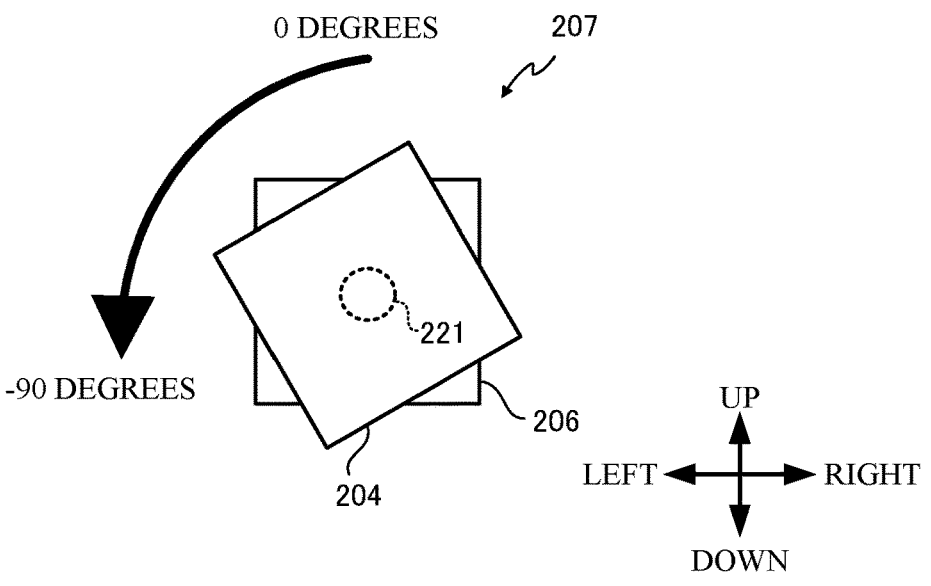
FIG. 4 is a diagram illustrating an example of the movement of a twist motor of the robot according to the embodiment.
Figure 5:
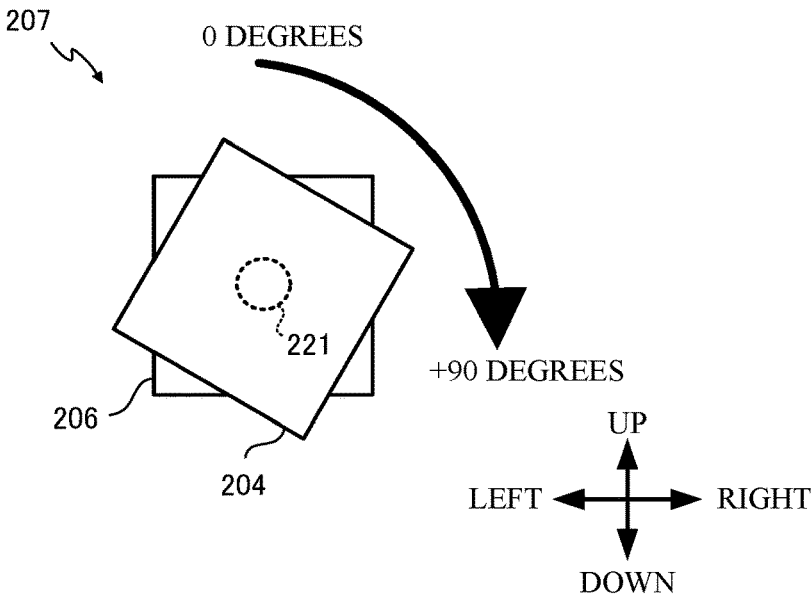
FIG. 5 is another diagram illustrating an example of the movement of the twist motor of the robot according to the embodiment.

The joint 205 couples the body 206 and the head 204 in such a way that the body 206 and the head 204 freely rotate (by the twist motor 221) about a first rotational axis extending back and forth along the body 206 through the joint 205. As illustrated in FIGS. 4 and 5 as the front view of the housing 207, the twist motor 221 causes the head 204 to rotate clockwise (right turn) relative to the body 206 within a range of forward rotation angle about the first rotational axis (forward rotation), or rotate counterclockwise (left turn)

within a range of reverse rotation angle (reverse rotation). Note that the clockwise direction herein is the clockwise direction when viewed from the head 204 toward the direction of the body 206. The clockwise rotation is also referred to as the "rightward twist" and the counterclockwise rotation as the "leftward twist." The maximum value of the angle to be twisted to the right or left is arbitrary. However, in the present embodiment, the rotation angle is up to 90 degrees leftward and rightward. As illustrated in FIG. 3, the angle of the head 204 in a state in which the head 204 is not twisted to the right or left (hereinafter, referred to as a "twist reference angle") is 0 degrees. The angle of the head 204 when twisted to the leftmost (rotated counterclockwise) is −90 degrees, as illustrated in FIG. 4. The angle of the head 204 when twisted to the rightmost (rotated clockwise) is +90 degrees, as illustrated in FIG. 5.

Figure 6:
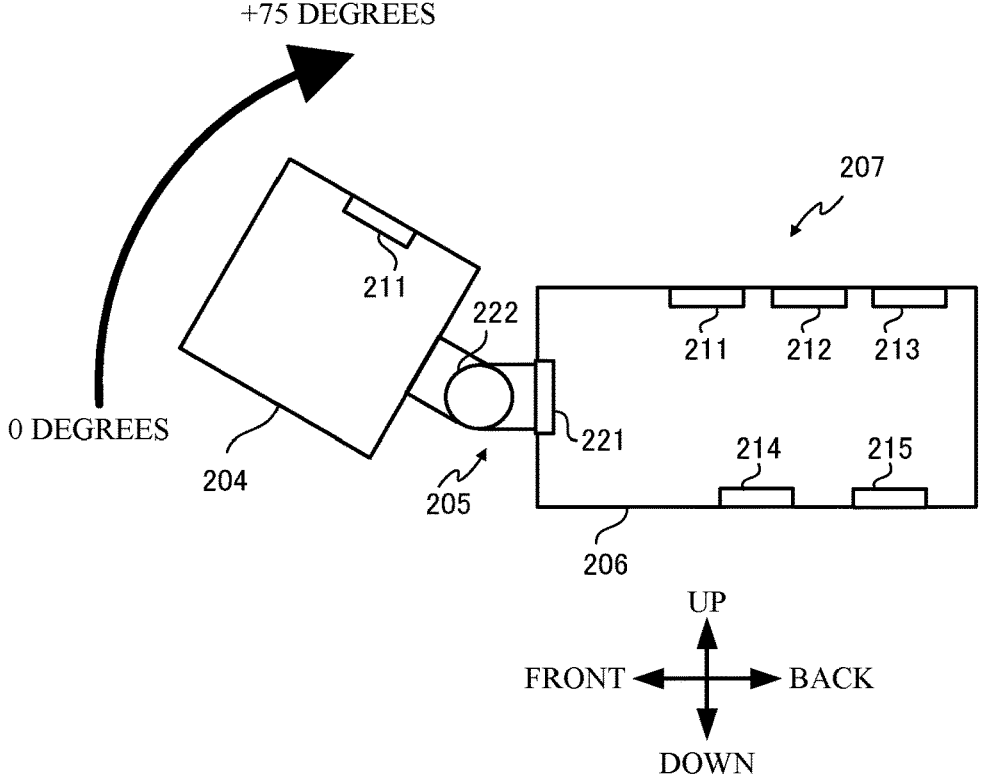
FIG. 6 is a diagram illustrating an example of the movement of an up-and-down motor of the robot according to the embodiment.
Figure 7:
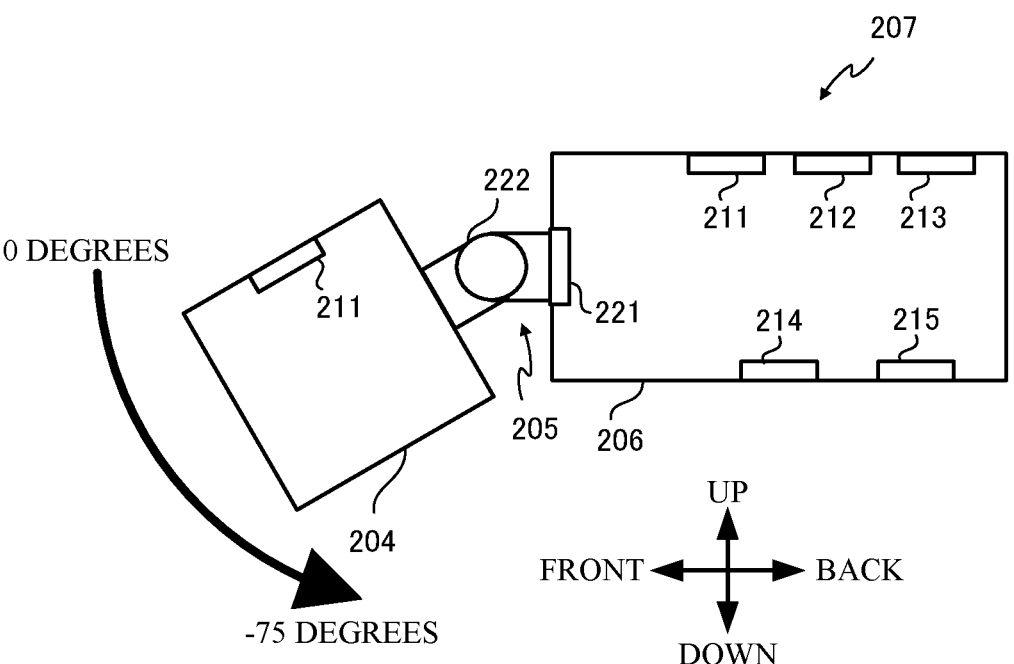
FIG. 7 is another diagram illustrating an example of the movement of the up-and-down motor of the robot according to the embodiment.

The joint 205 also connects the body 206 and the head 204 in such a way that the body 206 and the head 204 can rotate freely (by the up-and-down motor 222) about a second rotational axis extending in the width direction (left-and-right direction) of the body 206 through the joint 205. As illustrated in FIGS. 6 and 7 as a side view of the housing 207, the up-and-down motor 222 causes the head 204 to rotate upward (forward rotation) within a range of forward rotation angle about a second rotational axis, or rotate downward (reverse rotation) within a range of reverse rotation angle. The maximum value of the rotation angle upward or downward is arbitrary. However, in the present embodiment, the rotation angle is up to 75 degrees upward and downward. As illustrated in FIG. 2, the angle of the head 204 in a state in which the head 204 is not rotated upward or downward (hereinafter, referred to as an "up-and-down reference angle") is 0 degrees. The angle of the head 204 when rotated to the highest position is +75 degrees, as illustrated in FIG. 6. The angle of the head 204 when rotated to the lowest position is −75 degrees, as illustrated in FIG. 7. Note that when the head 204 is rotated to or below the up-and-down reference angle due to up-and-down rotation about the second rotational axis, the head 204 can contact, through the exterior 201, the mounting surface 101, such as a floor or a table, on which the robot 200 is placed. Although FIG. 2 illustrates an example in which the first rotational axis and the second rotational axis are orthogonal to each other, the first and second rotational axes may not be orthogonal to each other.

The robot 200 also includes a touch sensor 211 in the head 204 in order to detect that a user has stroked or tapped the head 204, as illustrated in FIG. 2. The robot 200 also includes a touch sensor 211 in the body 206 in order to detect that a user has stroked or tapped the body 206.

The robot 200 also includes an acceleration sensor 212 in the body 206 in order to detect a posture (orientation) of the robot 200 or to detect that the robot 200 has been lifted, turned, or thrown by a user. The robot 200 also includes a gyro sensor 213 in the body 206 in order to detect that the robot 200 is rolling or rotating.

The robot 200 also includes a microphone 214 in the body 206 in order to detect an external sound. In addition, the robot 200 includes a speaker 215 in the body 206 in order that the speaker 215 can be used to emit a sound (a sound effect) of the robot 200.

Although the acceleration sensor 212, the gyro sensor 213, the microphone 214, and the speaker 215 are provided in the body 206 in the present embodiment, all or some of these may instead be provided in the head 204. Alternatively, in addition to the acceleration sensor 212, gyro sensor 213, microphone 214, and speaker 215 provided in the body 206, all or some of these may also be provided in the head 204. Although the touch sensors 211 are provided in both the head 204 and the body 206, a touch sensor 211 may be provided only in either the head 204 or the body 206. Alternatively, a plurality of touch sensors 211 may be provided in one or both of the head 204 and the body 206.

Figure 8:
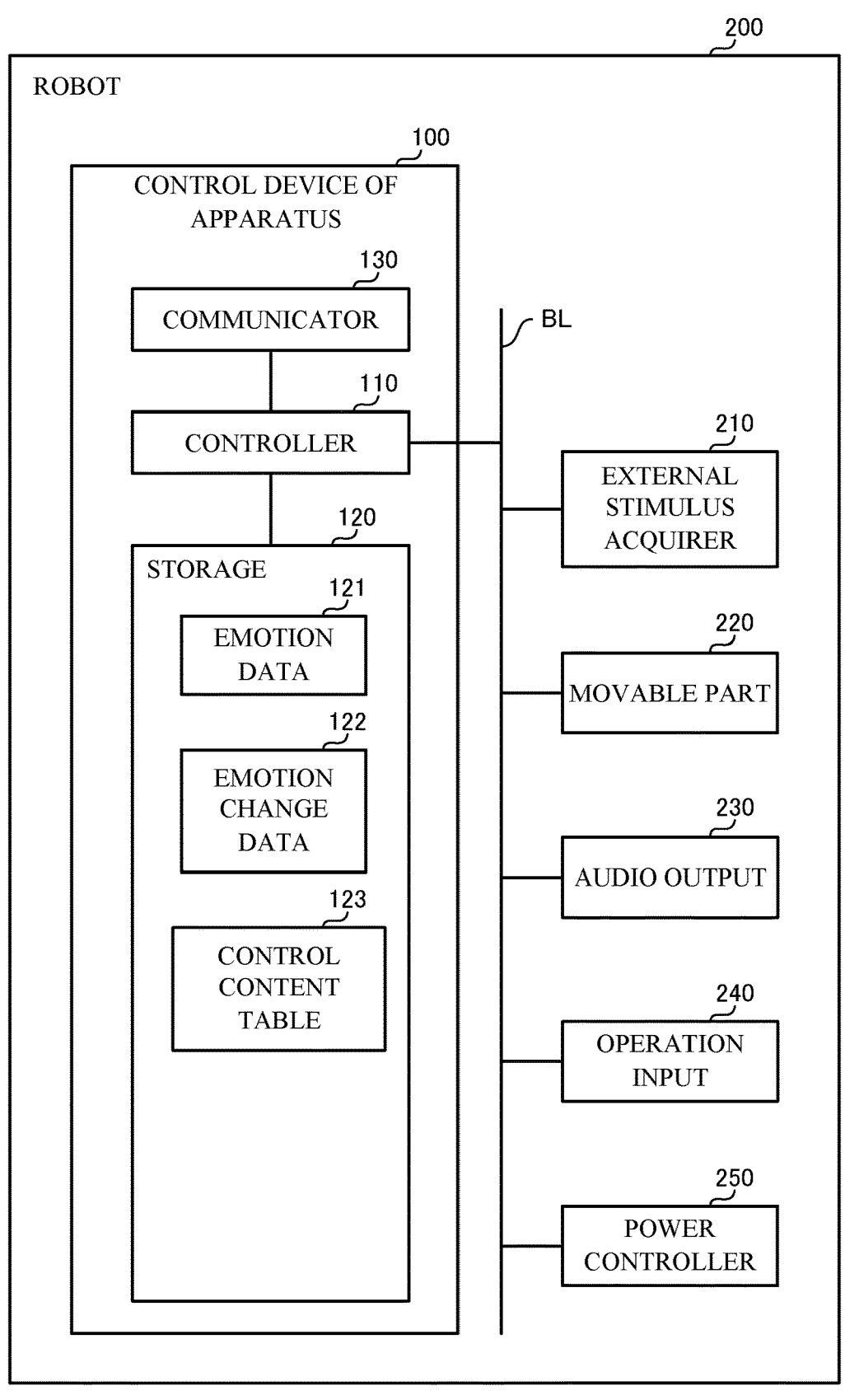
FIG. 8 is a block diagram illustrating the functional configuration of the robot according to the embodiment.

Next, the functional configuration of the robot 200 is described. The robot 200 includes, as illustrated in FIG. 8, a control device 100 of the apparatus, an external stimulus acquirer 210, a movable part 220, an audio output 230, an operation input 240, and a power controller 250. The control device 100 of the apparatus includes a controller 110, a storage 120, and a communicator 130. In FIG. 8, the control device 100 of the apparatus is connected to the external stimulus acquirer 210, the movable part 220, the audio output 230, the operation input 240, and the power controller 250 via a bus line BL, as an example. The control device 100 of the apparatus may be connected to the external stimulus acquirer 210, the movable part 220, the audio output 230, the operation input 240, and the power controller 250 via a wired interface such as a universal serial bus (USB) cable or a wireless interface such as Bluetooth (registered trademark) or the like. In addition, the controller 110 may be connected to the storage 120 and the communicator 130 via a bus line BL or the like.

The control device 100 of the apparatus controls the operation of the robot 200 by the controller 110 and the storage 120.

The controller 110 includes, for example, a central processing unit (CPU) or the like, and executes various processing (robot control processing, fall detection processing, roll detection processing, pick-up detection processing, rotation detection processing, and/or the like) as described later by a program stored in the storage 120. Note that the controller 110 is compatible with a multithreading function that executes a plurality of processes in parallel, and thus various types of processing (robot control processing, fall detection processing, roll detection processing, pick-up detection processing, rotation detection processing, and the like) as described later can be executed in parallel. In addition, the controller 110 includes a clock function, a timer function, and/or the like, and can time a date and time and/or the like.

The storage 120 includes a read-only memory (ROM), a flash memory, a random access memory (RAM), and/or the like. The ROM stores a program to be executed by the CPU of the controller 110 and other data that are a prerequisite for executing the program. The flash memory is a rewritable, non-volatile memory that stores data that should be retained even after the power is turned off. The RAM stores data that are created or modified during program execution.

The communicator 130 includes a communication module compatible with a wireless local area network (LAN), Bluetooth (registered trademark), and/or the like, and communicates data with an external device such as a smartphone. The details of data communication include, for example, alarm setting data and sleep setting data that are used to set an alarm function and a sleep function that are described later.

The external stimulus acquirer 210 includes the aforementioned touch sensor 211, acceleration sensor 212, gyro sensor 213, and microphone 214. The controller 110 obtains, via the bus line BL, detected values detected by various sensors equipped in the external stimulus acquirer 210 as external stimulus data representing an external stimulus acting on the robot 200. Note that the external stimulus acquirer 210 may also include other sensors than the touch sensor 211, the acceleration sensor 212, the gyro sensor 213, and the microphone 214. By increasing the types of sensors equipped in the external stimulus acquirer 210, the types of external stimuli that the controller 110 can obtain can be increased.

The touch sensor 211 detects that a certain object has come into contact. The touch sensor 211 includes, for example, a pressure sensor, a capacitance sensor, or the like. The controller 110 can obtain contact intensity and contact time based on the detected values from the touch sensor 211 in order to detect an external stimulus such as a user stroking or tapping the robot 200 based on these values.

The acceleration sensor 212 detects acceleration in three axis directions consisting of a front-and-back direction (X-axis direction), a width (left-and-right) direction (Y-axis direction), and an up-and-down direction (Z-axis direction) of the body 206 of the robot 200. Since the acceleration sensor 212 detects gravitational acceleration when the robot 200 is stationary, the controller 110 can detect the current posture of the robot 200 based on the gravitational acceleration detected by the acceleration sensor 212. Also, for example, when the user lifts or throws the robot 200, the acceleration sensor 212 detects the acceleration associated with the movement of the robot 200 in addition to the gravitational acceleration. Accordingly, the controller 110 can detect the movement of the robot 200 by subtracting the gravitational acceleration component from the detected value detected by the acceleration sensor 212.

The gyro sensor 213 detects an angular velocity when rotation is applied to the body of the robot 200. Specifically, the gyro sensor 213 detects an angular velocity of the three-axis rotation consisting of a rotation about the front-and-back direction axis (X-axis direction), a rotation about the width (left-and-right) direction axis (Y-axis direction), and a rotation about the up-and-down direction (Z-axis direction) axis of the body 206. The controller 110 can more accurately detect the motion of the robot 200 by combining the detected value detected by the acceleration sensor 212 with the detected value detected by the gyro sensor 213.

Note that the touch sensor 211, the acceleration sensor 212, and the gyro sensor 213 are synchronized, and the intensity, acceleration, and angular velocity of a contact are detected at the same timing, and the detected values are output to the controller 110. Specifically, the touch sensor 211, the acceleration sensor 212, and the gyro sensor 213 detect the intensity, acceleration, and angular velocity of a contact at the same timing, for example, every 0.1 seconds.

The microphone 214 detects sounds around the robot 200. The controller 110 can detect, for example, a user calling the robot 200 or clapping hands, based on the sound component detected by the microphone 214.

The movable part 220 is a mechanism for causing the robot 200 to perform a physical operation, and includes a driver such as a twist motor 221 and an up-and-down motor 222, a coupling member, a gear member, and the like for transmitting the force of the driver in order to move the head 204 and the like. The movable part 220 (the twist motor 221 and the up-and-down motor 222) is driven by the controller 110. The twist motor 221 and the up-and-down motor 222 are servo motors that, when instructed by the controller 110 with a specified operation time and operation angle, operate to rotate to the specified operation angle by the specified operation time. As a result, the robot 200 can express operations such as, for example, lifting the head 204 (rotating the head 204 upward about the second rotational axis) or twisting the head 204 sideways (rotating the head 204 rightward or leftward about the first rotational axis). Motion data for driving the movable part 220 to express these operations are recorded in a control content table 123 as described later.

The audio output 230 includes a speaker 215 that outputs a sound when the controller 110 has input sound data into the audio output 230. For example, when the controller 110 inputs sound data of the robot 200 to the audio output 230, the robot 200 emits a simulated sound. The sound data are also recorded in the control content table 123 as sound effect data.

The operation input 240 includes, for example, an operation button and a volume knob. The operation input 240 is an interface for accepting an operation by a user (an owner or a borrower), for example, power on/off and volume adjustment of output sound.

The power controller 250 includes a sub microcomputer, a charging integrated circuit (IC), a power control IC, a power receiving unit, and/or the like, and charges the battery of the robot 200, obtains a remaining power level, and controls the power supply of the robot 200.

Next, emotion data 121, emotion change data 122, and a control content table 123 that are characteristic data of the present embodiment, are described sequentially among data stored in the storage 120 of the control device 100 of the apparatus.

The emotion data 121 are data for causing the robot 200 to show a simulated emotion. For example, the emotion data 121 are multidimensional data that individually quantify a comfort level (anxiety level), an excitement level (lethargic level), and/or the like.

The emotion change data 122 are data that indicate a simulated emotional change level of the robot 200 indicated by the emotion data 121. For example, the emotion change data 122 are data indicating individual change amounts in the values of the comfort level (anxiety level) and excitement level (lethargy level) indicated by the emotion data 121. Since the emotion change data 122 can tell the tendency of the simulated emotional change of the robot 200, the emotion change data 122 can be said to be data representing the simulated character of the robot 200 (whether the robot 200 is shy, cheerful, active, spoiled, and/or the like).

Note that the emotion data 121 and the emotion change data 122 can adopt various types of data. For example, the emotion data 121 and the emotion change data 122 may be the types of data described in Unexamined Japanese Patent Application Publication No. 2021-69767.

The control content table 123 stores control conditions and control data in association with each other, as illustrated in FIG. 9. When a control condition (for example, a certain external stimulus is detected) is satisfied, the controller 110 controls the movable part 220 and the audio output 230 based on corresponding control data (motion data in order to express a movement by the movable part 220 and sound effect data in order to output a sound effect by the audio output 230).

The motion data are a series of sequence data for controlling the movable part 220 (in the order of time (milliseconds), rotation angle (degrees) of the up-and-down motor 222, and rotation angle (degrees) of the twist motor 221), as illustrated in FIG. 9. For example, when the body is stroked, the controller 110 controls the movable part 220 by setting the rotation angles of the up-and-down motor 222 and the twist motor 221 to 0 degrees (up-and-down reference angle and twist reference angle) at first (0 seconds), raising the head 204 in such a way that the rotation angle of the up-and-down motor 222 becomes 60 degrees in 0.5 seconds, and twisting the head 204 in such a way that the rotation angle of the twist motor 221 becomes 60 degrees in 1 second.

Although, in FIG. 9, a text explaining each sound effect data is described to facilitate understanding, in fact, the sound effect data themselves (the sampled sound data) explained by these texts are stored in the control content table 123 as sound effect data.

Although the control content table illustrated in FIG. 9 does not include a condition related to emotion (represented by the emotion data 121) in the control conditions, the control data may be changed according to an emotion by including a condition related to emotion in the control conditions.

Figure 10:
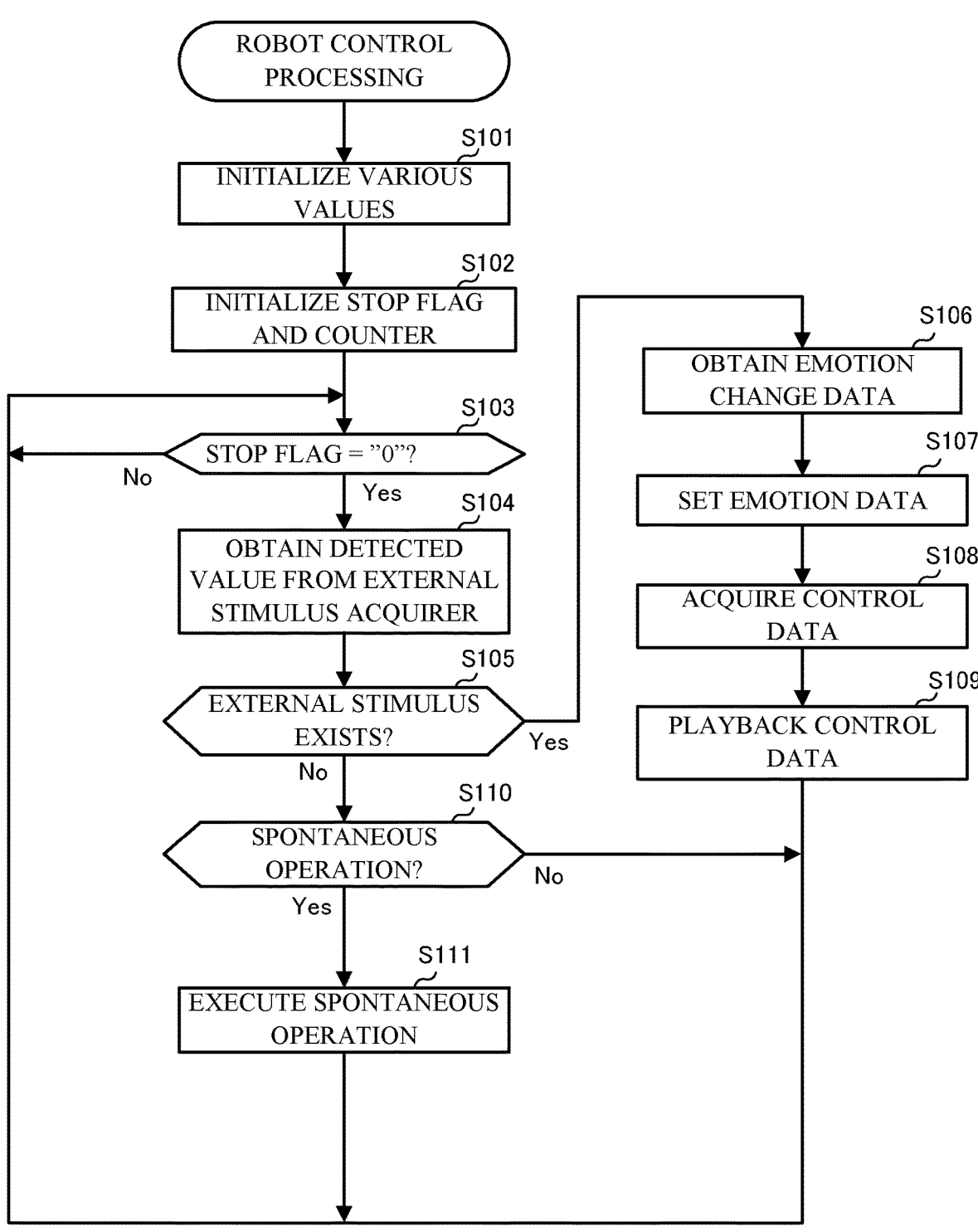
FIG. 10 is a flowchart of robot control processing according to the embodiment.

Next, robot control processing executed by the controller 110 of the control device 100 of the apparatus is described with reference to the flowchart illustrated in FIG. 10. The robot control processing is processing in which the control device 100 of the apparatus controls an operation and sound of the robot 200 based on a detected value or the like from the external stimulus acquirer 210. When a user turns on the robot 200, the thread of the robot control processing is started in parallel with the various detection processing and the like described later. Through the robot control processing, the movable part 220 and the audio output 230 (sound output unit) are controlled, thereby expressing a movement and outputting audio such as a sound of the robot 200.

First, the controller 110 initializes various types of data such as emotion data 121 and emotion change data 122 (step S101). Note that, for the second activation of the robot 200 and after, the values that were set at the time the robot 200 last turned off may be set at step S101. This can be achieved by the controller 110 storing the value of each data in the non-volatile memory (a flash memory or the like) of the storage 120 when the last power-off operation is performed, and then setting the stored value to the value of each data when the power is turned on.

Subsequently, the controller 110 initializes, to "0," the values of various stop flags (a fall stop flag, a roll stop flag, a pick-up stop flag, and a rotation stop flag) and various counters (a fall determination counter, a roll determination counter, a pick-up determination counter, a rotation detection counter, a fall stop counter, a roll stop counter, a pick-up stop counter, and a rotation stop counter) that are set and referred to in the various detection processing described later (fall detection processing, roll detection processing, pick-up detection processing, and rotation detection processing) (step S102).

Subsequently, the controller 110 determines whether or not the values of the various stop flags (the fall stop flag, the roll stop flag, the pick-up stop flag, and the rotation stop flag) are all "0" (step S103).

When not all values of the stop flags are "0," in other words, the value of a certain stop flag is "1" (step S103; No), an abnormal state of the robot 200 is detected in any of the various detection processing as described later. Accordingly, the controller 110 stands by until the values of all the stop flags become "0" without performing any subsequent steps of the robot control processing. As a result, the robot 200 will no longer perform an operation in response to a motion stimulus or a spontaneous operation such as breathing, indicating a state as if the animal has fainted (fainted state).

On the other hand, if all the values of the various stop flags are "0" (step S103; Yes), the controller 110 obtains a detected value detected by the external stimulus acquirer 210 (step S104). The controller 110 then determines whether or not any external stimulus was present based on the obtained detected value (step S105).

When an external stimulus was present (step S105; Yes), the controller 110 obtains emotion change data 122 according to the detected value of the external stimulus obtained at step S104 (step S106). Specifically, for example, when the touch sensor 211 of the head 204 detects that the head 204 has been stroked as an external stimulus, the robot 200 obtains a simulated comfort feeling, and thus the controller 110 obtains emotion change data 122 indicating an added amount to add to the value of comfort level included in the emotion data 121.

The controller 110 then sets the emotion data 121 based on the emotion change data 122 obtained at step S106 (step S107). Specifically, for example, when an added amount of the value of a comfort level has been obtained as the emotion change data 122 at step S106, the controller 110 adds this added amount to the value of the comfort level included in the emotion data 121.

Subsequently, the controller 110 refers to the control content table 123 and obtains control data associated with the control condition that is satisfied by the detected value of the obtained external stimulus (step S108).

The controller 110 then playbacks the control data obtained at step S108 (step S109) and returns to step S103. This allows the robot 200 to perform an operation in response to an external stimulus. Note that the content of the control data to be playbacked may be adjusted (changed) based on the set emotion data 121.

On the other hand, at step S105, when there is no external stimulus (step S105; No), the controller 110 determines whether or not to perform a spontaneous operation (such as a breathing imitation operation that imitates breathing of a living thing) (step S110). Although the method of determining whether or not to perform the spontaneous operation is optional, in the present embodiment, the determination of step S110 is Yes and the breathing imitation operation is performed at each breathing cycle (for example, 2 seconds).

If a spontaneous operation is not performed (step S110; No), the controller 110 returns to step S103. If a spontaneous operation is performed (step S110; Yes), the controller 110 performs a spontaneous operation (for example, a breathing imitation operation) (step S111) and returns to step S103.

The control data of this spontaneous operation are also stored in the control content table 123 (for example, as indicated by "breathing cycle elapsed" in the "control condition" in FIG. 9). Just as when the external stimulus was present, at step S111, the control content of the spontaneous operation may be adjusted (changed) based on the set emotion data 121.

Next, detection processing for detecting various abnormal states (fall detection processing, roll detection processing, pick-up detection processing, and rotation detection processing) performed by the controller 110 of the control device 100 of the apparatus, is described with reference to the flowcharts illustrated in FIGS. 11 to 14. Each thread of the detection processing is interrupt processing that is repeatedly executed every 0.1 seconds in parallel with the robot control processing described above while the power is supplied to the robot 200. The fall detection processing, roll detection processing, pick-up detection processing, and rotation detection processing are exclusively controlled, and two or more threads of detection processing are not executed simultaneously. Each thread of the detection processing detects an abnormal state (falling state, rolling state, pick-up state, rotating state) in which the robot 200 may be subjected to an impact, and, when an abnormal state is detected, the robot 200 is controlled in such a way that the movable part 220 suppresses the impact.

First, fall detection processing is described in detail with reference to FIG. 11.

At first, the controller 110 determines whether or not the value of a fall stop flag is "1" (step S201).

If the value of the fall stop flag is not "1" (step S201; No), that is, "0", the controller 110 determines whether or not the value of a fall counter is "2" or more (step S202).

If the value of the fall counter is less than "2" (step S202; No), the controller 110 reads out the acceleration aX in the front-and-back direction (X-axis direction), the acceleration aY in the left-and-right direction (Y-axis direction), and the acceleration aZ in the up-and-down direction (Z-axis direction) of the robot 200 detected by the acceleration sensor 212 (step S203).

Then, the controller 110 calculates the value of an acceleration vector V obtained by synthesizing the read-out accelerations aX, aY, and aZ as indicated by the following equation (1) (step S204).

[Math 1]

$$V = \sqrt{aX^2 + aY^2 + aZ^2} \qquad (1)$$

Then, the controller 110 determines whether the calculated acceleration vector V is smaller than the acceleration threshold GT that is considered to be a free fall state in order to determine whether the robot 200 is free falling (step S205). In the case of a complete free fall, the acceleration vector V is 0. However, since a rotational motion and the like may also be added during a free fall, it is desirable to set the acceleration threshold GT to a value with a certain margin (for example, a value of ⅕ of the gravitational acceleration).

If the acceleration vector V is smaller than the acceleration threshold GT (step S205; Yes), the controller 110 adds 1 to the value of the fall counter (step S206). Then the fall detection processing ends.

On the other hand, when the acceleration vector V is equal to or greater than the acceleration threshold GT (step S205; No), the robot 200 is not currently free falling, and thus the controller 110 initializes the values of the fall counter and the fall stop flag to "0" (step S207). Then, the fall detection processing ends.

When the value of the fall counter is "2" or more (step S202; Yes), that means the acceleration vector V is continuously determined to be less than the acceleration threshold GT in the last two or more threads of fall detection processing that have been repeatedly executed every 0.1 seconds, the robot 200 is determined to be in a falling state continuously for 0.2 seconds or more. Accordingly, the controller 110 sets the fall stop flag to "1" and initializes the fall counter and the fall stop counter to "0" (step S208). By setting the fall stop flag to "1," the procedure of the aforementioned robot control processing (FIG. 10) stops, and control data playback processing in response to an external stimulus (step S109) and a spontaneous operation such as breathing (step S110) are no longer performed, and the robot 200 becomes in a state as if it has fainted (fainting state).

Returning to FIG. 11, the controller 110 then controls the movable part 220 to be in a free state (step S209). Specifically, the controller 110 transmits a stop signal to the twist motor 221 and the up-and-down motor 222. The twist motor 221 and the up-and-down motor 222 that received the stop signal stop driving, and the motors become in a free state in which no torque is applied to the motor even if a force is applied to rotate the motor from the outside (for example, in the case of a coil motor, the coil becomes in an open state). This makes it possible to reduce damage to the movable part 220 even if the robot 200 subsequently collides with a floor, a table, or the like due to the fall. For example, even if the head 204 collides with a floor, a table, or the like, the coupling member, gear member, and the like of the movable part 220 for moving the head 204 move freely in the direction in which the head 204 was impacted without resistance, as a result, preventing excessive force from being applied to these members and preventing damage to these members or the motors.

The controller 110 then outputs a screaming sound that a living thing the robot 200 imitates is expected to make during a fall from the audio output (S210), and the fall detection processing ends. Note that the controller 110 may differentiate the details of the screaming sound to be output in accordance with the simulated emotion and character of the robot 200. For example, if the robot 200 has a shy character or has a lethargic emotion, the controller 110 may reduce the volume of the screaming sound or may not output the screaming sound.

On the other hand, if the value of the fall stop flag is "1" (step S201; Yes), the robot 200 is currently in a fainting state. Accordingly, the controller 110 carries out a control to recover the robot 200 from such a state. In other words, in this case, the controller 110 first adds "1" to the value of the fall stop counter. (step S211).

Then, the controller 110 determines whether or not the value of the fall stop counter is equal to or greater than "50" (step S212).

When the value of the fall stop counter is less than "50" (step S212; No), a sufficient amount of time (5 seconds or more) has not elapsed since the robot control processing stopped (the robot 200 fainted) with the fall stop flag set to "1," and the fall detection processing ends without performing the recovery process because it is unnatural if the robot 200 as a living thing recovers at this timing.

On the other hand, when the value of the fall stop counter is "50" or more (step S212; Yes), a sufficient amount of time (5 seconds or more) has elapsed since the robot control processing was stopped (the robot 200 fainted) with the fall stop flag set to "1." Then, the controller 110 sets the fall stop flag and the fall stop counter to "0" (step S213). As a result, the robot control processing (FIG. 10) resumes, playback of the control data in response to an external stimulus (step S109) and a spontaneous operation such as breathing (step S110) are performed, and the robot 200 behaves as if it has recovered from the fainting state. In addition, the twist motor 221 and the up-and-down motor 222 are appropriately driven by the execution of step S109 or step S110, and the free state of the movable part 220 is released. Then, the fall detection processing ends.

Next, roll detection processing is described with reference to FIG. 12 focusing on details that are different from the fall detection processing described above.

Roll detection processing is basically the same processing as the fall detection processing. However, the roll detection processing differs in that a rolling state is detected instead of a falling state of the robot 200. Accordingly, in the roll detection processing, the angular velocity rX of the rotation about the front-and-back direction (X-axis direction) axis of the robot 200 is read out from the gyro sensor 213 (step S303). Then, when the absolute value of the angular velocity rX is greater than the rolling threshold RXT (step S305; Yes), the robot 200 is determined to be in a rolling state and the roll counter is incremented (step S306). The other steps are substantially the same as the fall detection processing, and thus descriptions thereof are omitted.

Next, pick-up detection processing is described with reference to FIG. 13 focusing on details that are different from the fall detection processing described above.

The pick-up detection processing is basically the same as the fall detection processing. However, the pick-up detection processing differs in that a pick-up state is detected instead of a falling state of the robot 200. Accordingly, in the pick-up detection processing, the acceleration aZ in the up-and-down direction (Z axis direction) of the robot 200 is read out from the acceleration sensor (step S403). Then, when the value of the acceleration aZ is greater than the pick-up threshold GZT (step S405; Yes), the robot 200 is determined to be in a pick-up state and the pick-up counter is incremented (step S406). The other steps are substantially the same as the fall detection processing, and thus descriptions thereof are omitted.

Next, rotation detection processing is described with reference to FIG. 14 focusing on details that are different from the fall detection processing described above.

The rotation detection processing is basically the same as the fall detection processing. However, the rotation detection processing differs in that a rotating state is detected instead of a falling state of the robot 200. Accordingly, in the rotation detection processing, the angular velocity rZ of the rotation about the up-and-down direction (Z-axis direction) axis of the robot 200 is read out from the gyro sensor 213 (step S503). Then, when the absolute value of the angular velocity rZ is greater than the rotation threshold RZT (step S505; Yes), robot 200 is determined to be in a rotating state and the rotation counter is incremented (step S506). The other steps are substantially the same as the fall detection processing, and thus descriptions thereof are omitted.

Thus, according to the control device 100 of the apparatus according to the present embodiment, when the robot 200 is determined to be likely to be subjected to an impact (when the robot 200 is determined to be in an abnormal state (any of a falling state, a rolling state, a pick-up state, or a rotating state)), the movable part 220 is transferred from an operable state (a first state) to a free state (a second state) for suppressing an impact exerted on the movable part 220. This makes it possible to suppress damage to the movable part 220 when the robot 200 is subjected to an impact.

Figure 12:
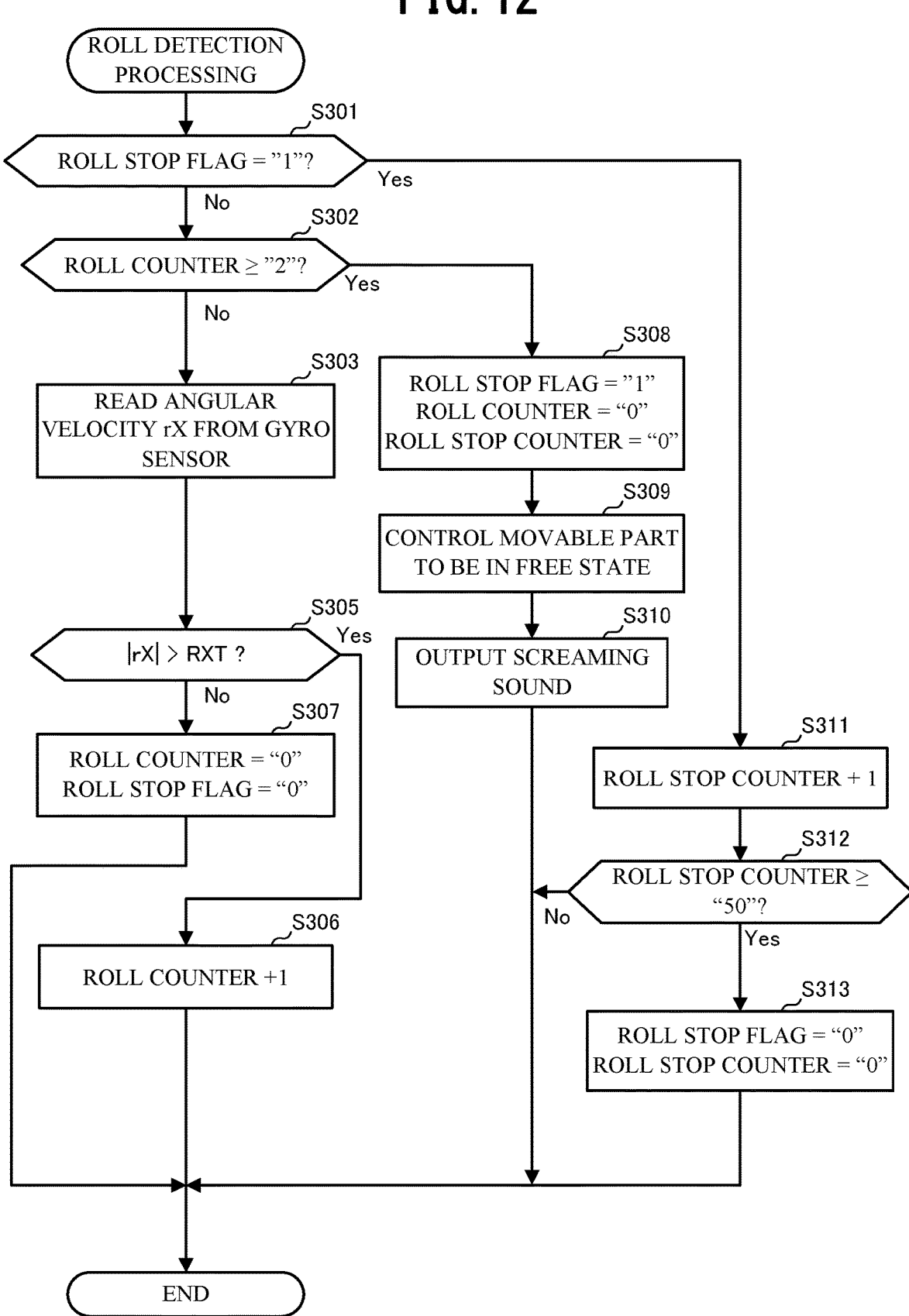
FIG. 12 is a flowchart of roll detection processing according to the embodiment.

In addition, according to the control device 100 of the apparatus according to the present embodiment, when the robot 200 is determined to be likely to be subjected to an impact (when an abnormal state is detected), the movable part 220 is transferred to a free state, and an operation that does not require the movable part 220 is executed to imitate a reaction of a living thing to be made when subjected to an impact (for example, output of a screaming sound (a second operation) at step S210 of FIG. 11, step S310 of FIG. 12, step S410 of FIG. 13, and step S510 of FIG. 14). This makes it possible to better express the characteristic of the living thing and to notify a user in the vicinity of the occurrence of the abnormal state.

Furthermore, according to the control device 100 of the apparatus according to the present embodiment, when an abnormal state is detected, the robot control processing (FIG. 10) stops with the stop flag set to "1." This causes the robot 200 to be in a fainting state (an execution stop state) in which the execution of all operations (first operation), including operations that do not use the movable part 220 (for example, an operation of the audio output 230), has stopped. As a result, it is possible to reproduce a behavior of a real living thing that has been shocked and fainted.

According to the control device 100 of the apparatus according to the present embodiment, after the first time (5 seconds in the embodiment) has elapsed since the movable part 220 was transferred to the free state (the second state), the robot control processing resumes with the stop flag reset to "0," the movable part 220 transfers to the operable state (the first state), and the fainting state (the execution stop state) of the robot 200 is canceled. This makes it possible to reproduce a behavior like a real living thing that can recover and move after a period of time has elapsed after fainting.

In addition, according to the control device 100 of the apparatus according to the present embodiment, the number of times that an abnormal state detection condition is continuously satisfied is counted in each detection processing. Then, when the number of times is "2" or more, that is, when the robot 200 is continuously determined to be likely to be subjected to an impact within a predetermined time period (0.2 seconds), the movable part 220 is controlled to be in a free state. This makes it possible to improve the accuracy of abnormal state detection.

Variations

Note that the present disclosure is not limited to the above-described embodiments, and various variations and applications are possible. For example, although, in the above embodiment, a falling state, a rolling state, a pick-up state, and a rotating state of the robot 200 have been detected as an abnormal state in which the robot 200 is likely to be subjected to an impact, the abnormal state is not limited thereto, and other states that are likely to lead to an impact in a short moment may be detected as abnormal states.

Although, in the above embodiment, when an abnormal state is detected, the movable part 220 is controlled to be in a free state as a state for reducing damage from an impact, the movable part 220 may be controlled to be in another state. For example, the movable part 220 may be controlled to be in an energy-saving operation mode, or the like, that makes output less than normal.

Although, in the above embodiment, the robot 200 can recover and resume all operations immediately after the first time (5 seconds) has elapsed from the fainting state, the robot 200 may be controlled to gradually recover from the fainting state. Specifically, the controller 110 may cancel the fainting state (execution stop state) 3 seconds after the movable part 220 has been transferred to the free state by setting the stop flag to "0" while maintaining the free state of the movable part 220, enabling operations other than those performed by the movable part 220 (for example, sound output from the audio output 230) to be executed. Subsequently, after 2 seconds (the second time) have elapsed, the controller 110 may transfer the movable part 220 from the free state to the operable state (the first state) to enable all operations to be executed. This makes it possible to reproduce a behavior even more like a real living thing.

In the above embodiment, even when the robot 200 goes into a fainting state due to any of the abnormal states of the falling state, rolling state, pick-up state, and rotating state, the robot control processing resumes uniformly after 5 seconds (after the first time has elapsed), and the operation of the robot 200 is recovered. However, depending on the determined abnormal state, the length of time to recover from the fainting (the first time) may vary. This can be achieved by appropriately changing the value "50" to be compared with the stop counter at step S212 of FIG. 11, step S312 of FIG. 12, step S412 of FIG. 13, and step S512 of FIG. 14. The length of the second time described above may also vary depending on the determined abnormal state. In this way, the robot 200 can have variations for the timing of recovery from the abnormal state, making it possible to operate even more like a living thing.

The controller 110 may also be able to estimate the intensity of an impact the robot 200 is about to receive in detection processing (fall detection processing, roll detection processing, pick-up detection processing, and rotation detection processing). For example, the intensity of such an impact may be estimated from the degree of deviation between a detected value detected by the acceleration sensor 212 or the gyro sensor 213 and the threshold. The controller 110 may then control the robot 200 to vary the aforementioned first time or second time depending on the estimated intensity of the impact. This makes it possible to control the robot 200 to operate even more like a real living thing, for example, by increasing the first time and increasing the time to recover when a very fast rotating state is detected than when a slower speed rotating state is detected.

The controller 110 may also control the robot 200 to vary the length of the above-described first time or second time based on the set emotion data 121. In this way, for example, when the set emotion data 121 indicates an emotion such as sadness, anxiety, or lethargy, the time to recover from an abnormal state is made longer than the normal emotion time by increasing the first time, making the robot 200 to operate even more like a real living thing.

In the above-described embodiment, the configuration is such that the control device 100 of the apparatus is embedded in the robot 200, but the control device 100 of the apparatus may not be embedded in the robot 200. For example, the control device 100 of the apparatus may be configured as a separate device (for example, a server) without being embedded in the robot 200. In this case, the robot 200 also includes a communicator, and is configured in such a way that the communicator 130 of the control device 100 of the apparatus and the communicator of the robot 200 can transmit and receive data to and from each other. Then, the controller 110 obtains an external stimulus detected by the external stimulus acquirer 210 through the two communicators, and controls the movable part 220 and the audio output 230.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

The invention claimed is:

1. A robot in which a head is connected to a body through a joint to be driven by output from a motor, the head being movable up and down or rotatable relative to the body by driving of the joint, the robot comprising a controller configured to execute:

processing of causing the joint to be driven at a predetermined first cycle by the output from the motor, to thereby cause the robot to perform a simulated breathing operation;

processing of determining, through detection of an output value from an acceleration sensor or a gyro sensor that is included in the robot at a predetermined second cycle, whether the robot is in a state of falling or in a state of rotating at a speed equal to or higher than a predetermined speed; and processing of, when the motor is in an operable state, in a case where a determination is made that the robot is in the state of falling or in a case where a determination is made that the robot is in the state of rotating at the speed equal to or higher than the predetermined speed, transferring the motor to a free state and causing the simulated breathing operation to be stopped, to thereby transfer the robot to a simulated fainting state.

2. The robot according to claim 1, wherein the controller causes, prior to transferring the motor to the free state, audio to be output as a predetermined reaction.

3. The robot according to claim 1, wherein after a lapse of predetermined time since transferring the motor to the free state, the controller transfers the motor to the operable state and causes the simulated breathing operation to be resumed, to thereby cause the robot to recover from the simulated fainting state.

4. The robot according to claim 3, wherein the robot is set such that a length of the predetermined time is different between the case where the determination is made that the robot is in the state of falling and in the case where the determination is made that the robot is in the state of rotating at the speed equal to or higher than the predetermined speed.

5. The robot according to claim 3, wherein the robot is set such that, in the case where the determination is made that the robot is in the state of rotating at the speed equal to or higher than the predetermined speed, a length of the predetermined time differs depending on the speed at which the robot rotates.

6. The robot according to claim 1, wherein the robot is covered with a furry exterior that imitates a living thing.

7. The robot according to claim 3 wherein the robot is set so as to have a simulated emotion, and
the robot is set such that a length of the predetermined time differs depending on the simulated emotion.

8. The robot according to claim 2, wherein the robot is set so as to have a simulated character or a simulated emotion, and
the robot is set such that the audio differs depending on the simulated character or the simulated emotion.

9. A method for mitigating collisions of a robot, the method comprising:

causing a joint of the robot to be driven at a predetermined first cycle by an output from a motor of the robot, to thereby cause the robot to perform a simulated breathing operation;

determining, through detection of an output value from an acceleration sensor or a gyro sensor of the robot at a predetermined second cycle, whether the robot is in a state of falling or in a state of rotating at a speed equal to or higher than a predetermined speed; and when the motor is in an operable state, in a case where a determination is made that the robot is in the state of falling or in a case where the determination is made that the robot is in the state of rotating at the speed equal to or higher than the predetermined speed, transferring the motor to a free state and causing the simulated breathing operation to be stopped, to thereby transfer the robot to a simulated fainting state.

10. A non-transitory computer-readable recording medium storing a program causing a controller provided in a robot to execute:

processing to cause a joint of the robot to be driven at a predetermined first cycle by an output from a motor of the robot, to thereby cause the robot to perform a simulated breathing operation;

processing to determine, through detection of an output value from an acceleration sensor or a gyro sensor of the robot at a predetermined second cycle, whether the robot is in a state of falling or in a state of rotating at a speed equal to or higher than a predetermined speed; and processing to, when the motor is in an operable state, in a case where a determination is made that the robot is in the state of falling or in a case where the determination is made that the robot is in the state of rotating at the speed equal to or higher than the predetermined speed, transfer the motor to a free state and cause the simulated breathing operation to be stopped, to thereby transfer the robot to a simulated fainting state.

* * * * *